Jan. 27, 1942.    C. H. SCHUH    2,271,443
CEMENT FIBROUS PRODUCT
Original Filed Jan. 26, 1935    2 Sheets—Sheet 1

INVENTOR
Charles H. Schuh
BY
Fred. W. Dodson.
ATTORNEY

Jan. 27, 1942.                C. H. SCHUH                2,271,443
                          CEMENT FIBROUS PRODUCT
                Original Filed Jan. 26, 1935      2 Sheets—Sheet 2

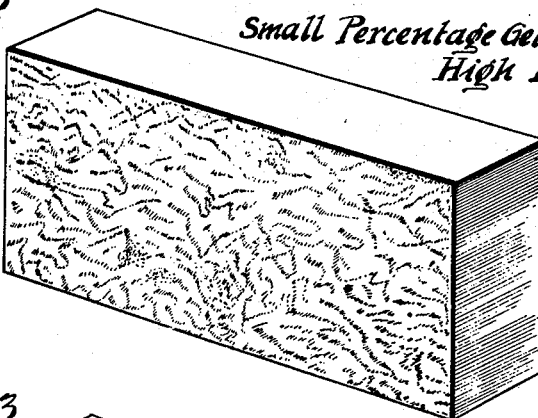

Fig. 2 — Small Percentage Gelatinous Wood Pulp High Impact.
DIRECTION OF IMPACT
SMOOTH, NATURAL, VARIEGATED GRAIN EFFECT AT SURFACE ONLY.
SUBSTANTIALLY NO VISIBLE FIBER.

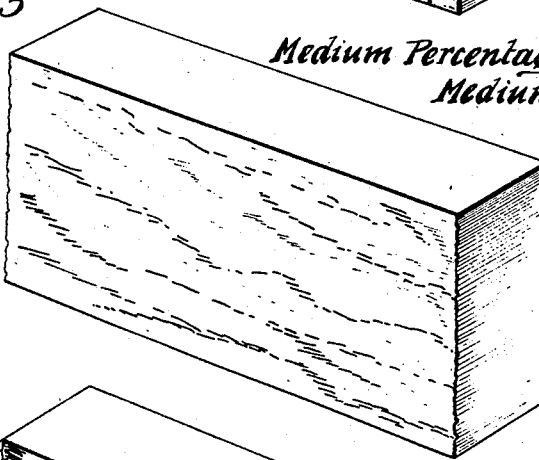

Fig. 3 — Medium Percentage Wood Pulp Medium Impact.
DIRECTION OF IMPACT
COARSE, NATURAL, SLIGHTLY VARIGATED GRAIN FINISH, SOMEWHAT LIKE CRACKED LEATHER, AT SURFACE ONLY.
SUBSTANTIALLY NO VISIBLE FIBER.

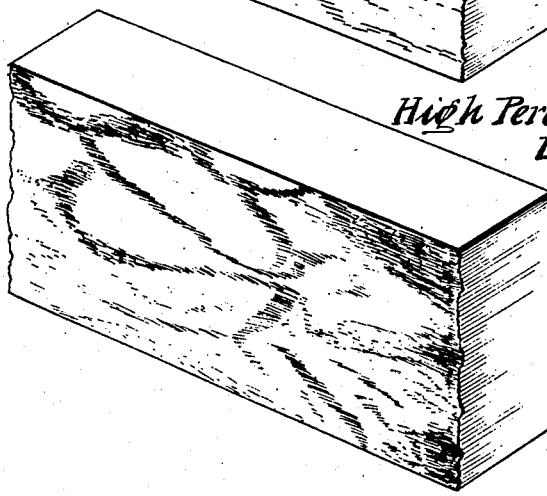

Fig. 4 — High Percentage Wood Pulp Low Impact.
DIRECTION OF IMPACT
COARSE, NATURAL, SLIGHTLY VARIGATED GRAIN EFFECT, BARK-LIKE IN APPEARANCE, AT SURFACE ONLY.
SUBSTANTIALLY NO VISIBLE FIBER.

INVENTOR.
Charles H. Schuh
BY
Sidney A. Ocha
ATTORNEY

Patented Jan. 27, 1942

2,271,443

UNITED STATES PATENT OFFICE 2,271,443

CEMENT FIBROUS PRODUCT

Charles H. Schuh, Ridgewood, N. Y., assignor, by mesne assignments, to Carbide and Carbon Chemicals Corporation, New York, N. Y., a corporation of New York Original application January 26, 1935, Serial No. 3,577. Divided and this application April 5, 1938, Serial No. 200,140

9 Claims. (Cl. 72—36)

The present invention relates to cement-fibrous products made by a novel process and is a division of my copending application Serial No. 3,577, filed January 26, 1935, now Patent No. 2,120,268, issued June 14, 1938.

Heretofore, various cement-fibrous compositions have been made by various processes, the most representative of which is the manufacture of the cement asbestos board which is made under exceedingly high hydraulic pressure. Generally speaking, these cement asbestos compositions have been made by first mixing together cement and ground asbestos fiber in aqueous suspension, second, feeding an Oliver type of filter to form a sheet on the filter cloth, third, removing the sheet from the filter, fourth, laying it out flat, fifth, stacking one upon another a number of sheets with sheets of metal between in a hydraulic press, and finally subjecting the stack to an exceedingly high pressure. After removal from the press the sheets are stored to harden. Although various attempts have been made to remedy the aforesaid process, none, as far as I am aware, has been wholly satisfactory, economical and practical.

It is an object of the invention to produce a cement-fibrous product having great strength, hardness, density and uniformity.

A further object of the invention is to produce a cement-fibrous product having superior qualities by the use of a simplified process and inexpensive equipment.

The present invention contemplates the provision of a practical and economical procedure for accurately molding a panel of cement-fibrous composition having a relatively high density, fine grain, smooth finished surface capable of being polished, possessing waterproof and fireproof qualities and being capable of being machined.

It is also within the contemplation of the invention to provide a process of manufacturing cement-fibrous products having an attractive color effect and surface finish.

Other objects and advantages of the invention will become apparent from the following description of a preferred procedure of carrying the invention into practice, taken in conjunction with the accompanying drawings.

In the drawings, Fig. 1 is a perspective view, somewhat diagrammatic, of an apparatus for carrying out the present invention;

Fig. 2 is a perspective view of a product of the present invention having a smooth, natural, variegated grain finish at the surface;

Fig. 3 is a perspective view of a product of the present invention having a coarse, natural, slightly variegated grain finish somewhat like cracked leather at the surface; and Fig. 4 is a perspective view of a product of the present invention having a coarse, natural, slightly variegated grain finish, bark-like in appearance at the surface.

Figure 1:
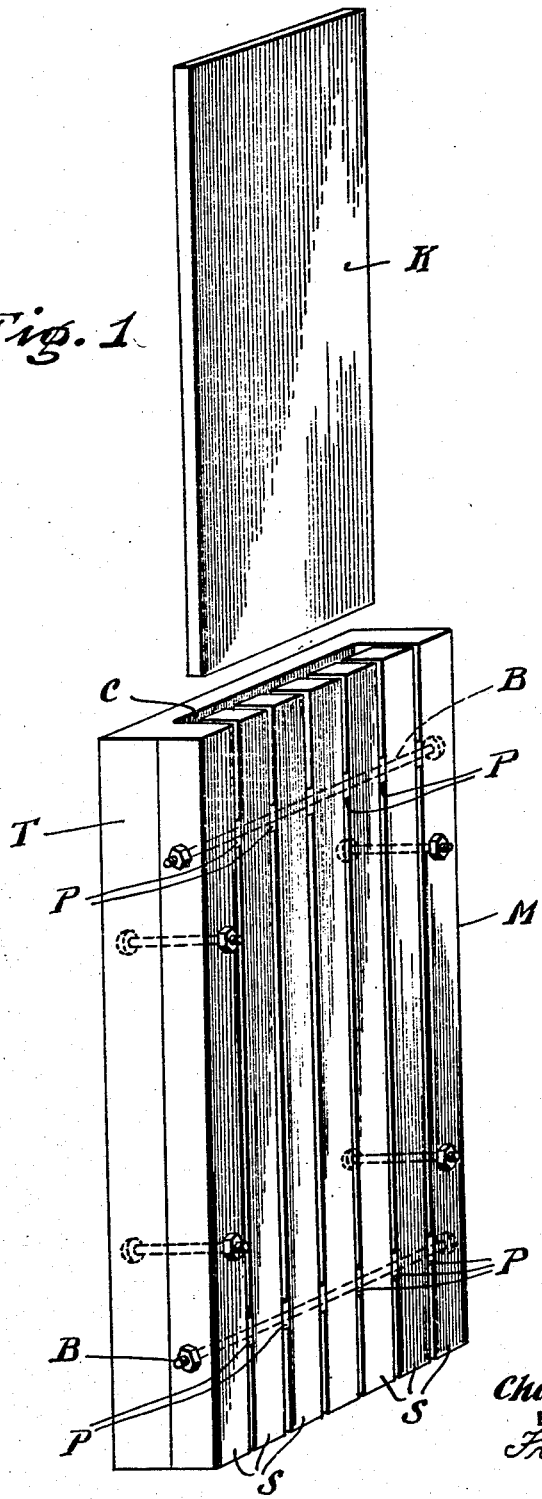

I have discovered that when fibrous material is brought into a relatively fine state of subdivision and dispersion or may even be brought into a gelatinous state and is then thoroughly mixed and ground together with cement, it is possible under proper conditions to both filter and compress the mixture into a dense hard sheet in one operation and to eliminate the use of both Oliver filter and hydraulic press equipment. I have found the surprising phenomenon that the aforesaid cement-fiber mass can be filtered on a bed composed of strips of steel separated from each other by a small gap, say a distance of approximately 1/40 of an inch. Moreover, I have found that even under pressure there is practically no tendency to clog the filter bed. Under these circumstances, it is possible to construct a filter bed of strips of steel of sufficient strength to withstand practically any desirable amount of pressure. I have further discovered that a filter bed may be made part of a chamber into which the mixture is pressed and by properly proportioning the chamber, a wedge type of action takes place in the chamber which permits pressure to be built up by a series of impacts instead of the application of continuous hydraulic pressure. In other words, by making the chamber sufficiently long and narrow and by applying pressure by forcing a plunger into one end of the chamber, then the wedge action takes place and it is merely necessary to apply a sufficient number of impacts to the plunger to get the desired compressive action. The wedge action holds the material in place between impacts and the effects are accumulative. In this manner, it is possible to secure compression effects far greater than has heretofore been possible with prior procedures using hydraulic pressure and with much more ease and simplicity of equipment.

For the purpose of giving those skilled in the art a better understanding of the invention, the following illustrative example will be given.

I mix together about 24% by weight gelatinized wood pulp with about 76% by weight Portland cement. The wood pulp need not be chemically pure, that is, it may contain resinous material present in the original wood, but should have a neutral reaction. It should be finely ground and worked into a gelatinous state. Chemical treatment with acid or zinc chloride may be employed to convert part of the fiber into amyloid. Approximately 40% by weight water may be used. The mixture is run into a mold M preferably having a chamber C of the following dimensions: 8" x 32" x ½". The filter bed is preferably composed of ½" x 4" x 32" steel strips S separated by small pieces of metal strips P of approximately 1/40" in thickness, and is bolted together by means of a plurality of bolts B to form a slotted unit plate 8" x 32" (by 4" thick). The bolted strips constitute one of the face walls of the mold. The other face of the mold is a smooth piece of strong steel plate T of the same dimensions, namely, 8" x 32" x 1". It is preferred to strengthen the plate with angle irons. The bottom and side edges are smooth strips of steel ½" thick which are bolted tightly together. In the top edge of the mold a tightly fitting plunger K 8" x ½" x 32" is inserted.

When the mold has been filled, the plunger is inserted and a series of impacts are applied to the top end thereof. The bulk of the excess water is quickly forced out through the filter bed and the wedge action becomes effective. A substantially clear filtrate is obtained. The compression action is in the same direction as the opening slots in the filter and this permits the material to slip under the action of the impact and cause the material to be compressed. The plunger may thus readily be forced half way down into the mold or even further. When the mold is opened, a panel 8" x 16" x ½" is obtained which has a smooth face on one side and which has slight parallel longitudinal ridges on the other face due to the slots in the filter bed. The sheet which is now capable of being handled is allowed to harden.

When the panel is hard, it will be strong and tough and may be cut with a saw, machined, nailed, and fabricated and handled in other customary ways. The smooth face can readily be polished to a beautiful finish having a novel surface grain effect not possible in products of the same composition made by hydraulic pressure processes. Such a panel may be used for one face of a building block unit. For this latter purpose it may be desired to have the edges tongue and grooved and to accomplish this it is only necessary to make suitable provisions in the mold edge.

I have found that when such a panel is placed in an alcoholic solution of an aniline dye for sufficient time to allow the solution to penetrate and then allowed to dry thoroughly, it may then be polished and a beautiful decorative finish is obtained on the surface. The aforesaid grain effect is made more pronounced by the dye and gives a variegated tone throughout the surface. I have found that the novel grain effect exists only at the surface. If the face is ground before polishing, a different texture results.

It is to be noted that in the aforesaid description, considerable detail has been given regarding mechanical details of the mold, etc. for the purpose of illustrating the wedge type of compressive action obtained. The same action may obviously be obtained in other types of molds and mechanical devices. The present invention is not to be limited to a particular type of mechanical device, but is to embrace a new general method for the production of cement-fibrous compositions embodying certain new principles, namely, first, the distribution of solid material including cement materials and fibrous materials in a liquid phase to obtain a mixture that is capable of being filtered under pressure without any difficulty of clogging the openings of an appropriate filter and secondly, to submit such a mixture to a wedge type of compressive action under which the material may be compressed to practically any desired degree by simply subjecting it to a sufficient number of impacts.

Obviously, the fibrous material might include wood, asbestos, straw, cotton, wool, hair, metal wool, paper, silk, jute, etc. The cementitious material might include Portland cement, natural cement, Roman cement, gypsum cement, litharge, resins, casein, starch, dried blood, glue, gelatin, pyroxylin, etc. The liquid need not necessarily be an aqueous one. Where resinous materials are used, appropriate solvents are employed, such as alcohols, esters, turpentine, etc.

It will be understood that the novel grain effect aforesaid will vary somewhat with different compositions and densities. For instance, where the wood pulp is reduced, as in the above example, to a gelatinous state, a substantially smooth grain textured surface is produced upon polishing. If, however, the wood pulp is not reduced to a gelatinous state, a rough grain texture surface results. Moreover, if the amount of wood pulp is reduced to below about 5%, a smooth grain textured surface will result even though the pulp is not reduced to a gelatinous state. Other fiber pulp produces somewhat similar results to that made by wood pulp.

For additional decorative effects, the fibrous material may be dyed before the mixture is made. Additional coloring material may be added as desired.

Figs. 2, 3 and 4 illustrate some of the different inherent natural grain textured finishes taken from stained and polished specimens of products of the present invention and obtained, for example, by varying the fiber content of the composition of such products and/or by varying the degree of impact employed in their processing. In general the patterns of the surface lines obtained with the different products run at right angles to the direction of impact. The use of fine gelatinous wood pulp in small amounts (less than 5%) as the fibrous constituent produces, as illustrated for example in Fig. 2, a very smooth surface, the surface lines existing only as a variegated color effect. For this fine textured, smooth surface a high degree of impact is also used. When a greater amount of wood pulp (in the order of 10%) is used and the degree of impact is only moderate a surface finish is obtained as illustrated, for example, in Fig. 3. Here the surface lines are deeper and longer than in Fig. 2 and run in a pattern. The surface in this instance is not entirely smooth due to the rougher surface grain and appears somewhat like cracked leather. By employing a still greater percentage of wood pulp (about 20%) and a low degree of impact a very coarse grained surface finish may be obtained as illustrated, for instance, in Fig. 4. Here the surface lines are still deeper than those of Fig. 3 and the surface is comparatively rough and has the general appearance of wood bark.

It is to be observed that the present invention enables the provision of a cement-fibrous product comprising a set and hardened structure of cement containing finely dispersed fibrous material, especially of a cellulosic and gelatinous type, which has practically no visible voids, is practically impervious to water, shows substantially no visible fibers, and has a density substantially greater than twice the density of the raw materials and a tensile strength substantially greater than about 1,000 pounds per square inch. Obviously, the composition used in the present process may be of the character set forth in my copending application Serial No. 3,578, filed January 26, 1935, now Patent No. 2,156,308, issued May 2, 1939, wherefrom a novel "Micro Cell" structure is produced. The expression "inherent natural grain textured finish" as used in the specification and claims is intended to mean a surface finish that is not artificially obtained and is thus distinguishable from a finish obtained, for example, by embossing, printing, application of coloring materials or use of colored agglomerates.

I claim:

1. An impact product of manufacture comprising a hardened, highly compact mass having substantially uniformly distributed cementitious material and fiber, said product exhibiting upon at least one face an inherent natural grain textured finish that exists only at the surface of the product and having a variegated surface color tone when stained and polished, the composition of the natural grain textured surface being identical with the body composition and an integral part thereof, and said product showing substantially no visible fiber, and being substantially impervious to water.

2. An impact product of manufacture comprising a hardened, highly compact mass having substantially uniformly distributed cementitious material and finely divided fiber, said product exhibiting upon at least one face an inherent natural grain textured finish that exists only at the surface of the product and having a variegated surface color tone when stained and polished, the composition of the natural grain textured surface being identical with the body composition and an integral part thereof, and said product having a density substantially greater than twice the average density of the dry raw materials comprising the same, and being substantially impervious to water.

3. An impact cement fiber product of manufacture comprising a hardened, highly compact mass having substantially uniformly distributed hydraulic cement material and finely divided fiber, said product exhibiting upon at least one face an inherent natural grain textured finish that exists only at the surface of the product and having a variegated surface color tone when stained and polished, the composition of the natural grain textured surface being identical with the body composition and an integral part thereof, and said product having a density substantially greater than twice the average density of the dry raw materials comprising the same, a tensile strength substantially greater than about 1,000 pounds per square inch and being substantially impervious to water.

4. An impact product of manufacture comprising a hardened, highly compact honeycombed mass comprising cementitious material and containing finely dispersed fibrous material in the cells thereof, said product exhibiting upon at least one face an inherent natural grain textured finish that exists only at the surface of the product and having a variegated surface color tone when stained and polished, the composition of the natural grain textured surface being identical with the body composition and an integral part thereof, and said product showing substantially no visible fiber, having a density substantially greater than twice the average density of the dry raw materials and being substantially impervious to water.

5. An impact product of manufacture comprising a hardened, highly compact mass having substantially uniformly distributed cementitious material and gelatinized fiber, said product exhibiting upon at least one face an inherent natural smooth grain textured finish that exists only at the surface of the product and having a variegated surface color tone when stained and polished, the composition of the natural grain textured surface being identical with the body composition and an integral part thereof, and said product showing substantially no visible fiber or voids and being substantially impervious to water.

6. An impact product of manufacture comprising a hardened, highly compact mass having substantially uniformly distributed resin binder and finely divided fiber, said product exhibiting upon at least one face an inherent natural grain textured finish that exists only at the surface of the product and having a variegated surface color tone when stained and polished, the composition of the natural grain textured surface being identical with the body composition and an integral part thereof, and said product showing substantially no visible voids and being substantially impervious to water.

7. An impact product of manufacture comprising a hardened, highly compact mass having substantially uniformly distributed cementitious material and pulped fiber substantially free of gelatinous fiber, said product exhibiting upon at least one face an inherent natural rough grain textured finish that exists only at the surface of the product and having a variegated surface color tone when stained and polished, the composition of the natural grain textured surface being identical with the body composition and an integral part thereof, and said product having a density substantially greater than twice the average density of the dry raw material comprising the same, and being substantially impervious to water.

8. An impact product of manufacture comprising a hardened, highly compact mass having substantially uniformly distributed powdered cementitious material and finely divided fiber comprising gelatinized cellulosic fiber, said product exhibiting upon at least one face an inherent natural fine grain textured finish that exists only at the surface of the product and having a variegated surface color tone when stained and polished, the composition of the natural grain textured surface being identical with the body composition and an integral part thereof, and said product having a density substantially greater than twice the average combined density of the dry powdered cementitious material and dry loose pulped fibrous material and having a tensile strength greater than about 1,000 pounds per square inch and being substantially impervious to water.

9. An impact product of manufacture comprising a hardened, highly compact mass having substantially uniformly distributed cementitious material and not more than 5% of fiber, said product exhibiting upon at least one face an inherent natural fine grain textured finish that exists only at the surface of the product and having a variegated surface color tone when stained and polished, the composition of the natural grain textured surface being identical with the body composition and an integral part thereof, and said product having a density substantially greater than twice the average density of the dry raw material and being substantially impervious to water.

CHARLES H. SCHUH.